INVENTOR.
JAMES C. MIDKIFF.
BY Alden D. Redfield
Charles M. Hogan
ATTORNEYS.

Oct. 22, 1963 J. C. MIDKIFF 3,108,225

SIGNAL SELECTOR AND AUTOMATIC GAIN CONTROL FOR SATELLITE COMMAND RECEIVER

Filed June 22, 1961 2 Sheets-Sheet 2

INVENTOR.
JAMES C. MIDKIFF

BY Alden D. Redfield
Charles M. Hogan
ATTORNEYS.

United States Patent Office 3,108,225

Patented Oct. 22, 1963

3,108,225

SIGNAL SELECTOR AND AUTOMATIC GAIN CONTROL FOR SATELLITE COMMAND RECEIVER

James C. Midkiff, Cincinnati, Ohio, assignor to Avco Corporation, Cincinnati, Ohio, a corporation of Delaware Filed June 22, 1961, Ser. No. 119,000
1 Claim. (Cl. 325—415)

The present invention relates to command receivers, specifically to radio receivers of the amplitude-modulated, very-high-frequency type which are employed, in response to commands from a ground station, to dictate the performance of various functions in objects moving in space, such as a rocket missile or an artificial satellite. It will be understood by those skilled in the art of space communications that command receivers constitute a portion of the equipment installed in missiles and artificial satellites.

A principal object of the invention is to provide a radio frequency tuner for command receivers which is characterized by a relatively constant output in the presence of a very wide range of input signal levels.

Another object of the present invention is to provide an improved attenuator type of gain control system for a radio frequency amplifier, the linear attenuation characteristic of the amplifier being maintained throughout the attenuation range.

Figure 1:
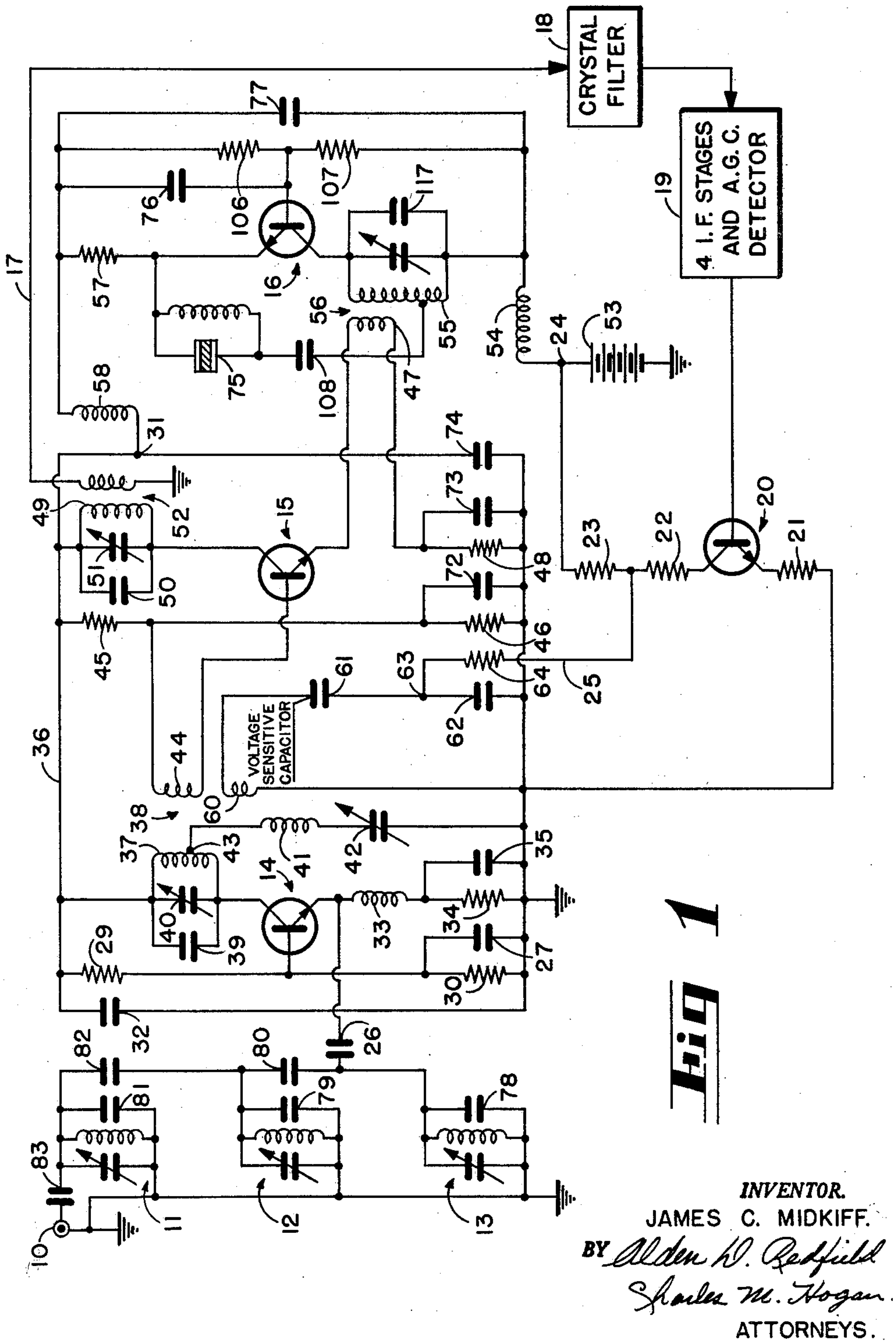
Figure 7:
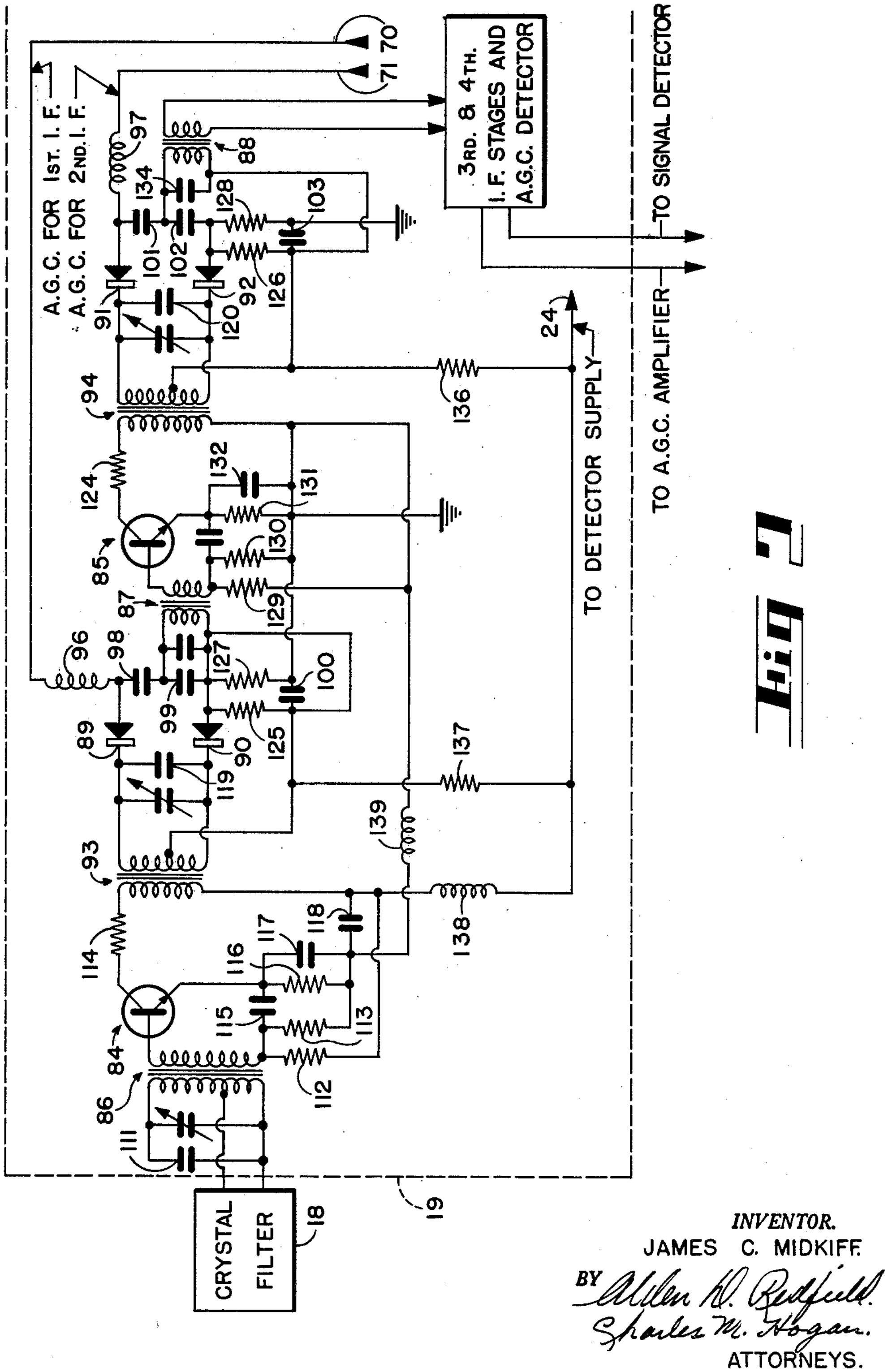

For a better understanding of the present invention, together with other objects, advantages, and capabilities thereof, reference is made to the following description of the appended drawings, in which:

FIG. 1 is a circuit schematic of a radio frequency tuner or "front end" system in accordance with the present invention; and FIG. 2 illustrates an intermediate frequency system suitable for use in conjunction with the present invention and in conjunction with gain control circuitry as illustrated in the copending patent application of Donald W. Bastian entitled "Electronic Automatic Control Circuitry for Satellite Command Receiver," Serial No. 118,791, filed contemporaneously herewith and assigned to the same assignee as the present application and invention. The just-mentioned copending patent application is specifically referred to for a description of such items and is herein incorporated by reference.

Referring now specifically to FIG. 1, there are illustrated a radio frequency amplifier stage including NPN transistor 14, a mixer including NPN transistor 15, and a local oscillator including NPN transistor 16, together with associated circuitry constituting the "front end" of a command receiver.

The signal output of this tuner appears between output conductor 17 and ground. It is filtered by crystal filter 18 and then amplified by four cascaded intermediate frequency stages illustrated in FIG. 2 and included within block 19 of FIG. 1. Block 19 further includes an automatic gain control detector, the output of which is applied to an automatic gain control amplifying transistor 20. The automatic gain control detector in block 19 is disclosed in detail in the above-mentioned copending patent application, as is also the automatic gain control amplifier transistor 20 and associated circuitry. It will be understood that the following elements of the present application correspond precisely to elements of the Bastian application as tabulated below:

| *Midkiff* | *Bastian* |
|---|---|
| Transistor 20 | Transistor 50 |
| Resistor 21 | Resistor 48 |
| Resistor 22 | Resistor 74 |
| Resistor 23 | Resistors 75, 76, 77, 78 |
| Terminal 24 | B+ or conductor 14 |
| Conductor 70 | Conductor 101 |
| Conductor 71 | Conductor 102 |

The input terminal 10 is connected to an antenna (not shown) and receives input signals on the order of 140 megacycles. The three parallel tuned circuits designated by the reference numerals 11, 12, and 13 constitute a triple-tuned preselector, which is coupled to the emitter of radio frequency amplifier stage 14 by a capaictor 26. This capacitor provides an impedance match between the preselector and transistor 14.

Radio frequency amplifier transistor 14 is arranged in the common base configuration A.C.-wise, the base being A.C. grounded by capacitor 27. Resistors 29 and 30 are connected in series effectively between positive voltage supply point 31 and ground, in order to apply a D.C. bias to the base of transistor 14, capacitor 32 being connected in shunt across resistors 29 and 30 for filtering purposes. The emitter load for transistor 14 comprises choke 33 and resistor 34, the latter being by-passed by capacitor 35. D.C.-wise, this transistor is arranged in the common emitter configuration. Between its collector and conductor 36 there is connected a tuned combination comprising the primary 37 of a transformer 38, paralleled by a capacitor 39 and adjustable capacitor 40. The collector bias circuit for this transistor is traced from conductor 36 through primary 37 to the collector. A series combination of inductance 41 and capacitance 42, connected between tap 43 on primary 37 and ground, is series-tuned to the undesired image frequency and provides an effective short circuit for same.

Referring now to the mixer circuit, it comprises an NPN transistor 15, the base of which is connected to one terminal of secondary 44 of transformer 38, the remaining terminal being connected to the junction of resistors 45 and 46, disposed between conductor 36 and ground, to provide D.C. bias for the base of transistor 15. Oscillator voltage is injected at approximately 130 megacycles by inductance 47, which, together with by-passed resistor 48, constitutes the emitter load for transistor 15. Connected between the collector of transistor 15 and conductor 36 is the tuned combination of inductance 49, paralleled by capacitor 50 and adjustable capacitor 51, this combination being tuned to 10 magacycles and coupled to the output circuit comprising conductor 17 and transformer 52, inductance 49 being the primary of that transformer.

Referring now to the D.C. supply, the positive terminal of a supply generally designated by the reference numeral 53 is effectively point 24, which is encircuited with point 31 by a series combination of choke 54, primary 55 of transformer 56, the collector-emitter circuit of oscillator transistor 16, the emitter resistor 57 of that transistor, and choke 58. The collector-emitter circuit of oscillator transistor 16 is in series with point 31, and therefore with the parallel combination of both the collector-emitter circuit of transistor 15 and the collector-emitter circuit of transistor 14. That is to say, the circuitry which establishes collector bias for transistor 15 is traced from point 31 via primary 49, transistor 15, secondary 47, and resistor 48 to ground. Similarly, the circuitry which provides collector bias for transistor 14 is traced from point 31 via primary 37, transistor 14, choke 33, and resistor 34 to ground.

Particular attention is now directed to the series-tuned circuit comprising tertiary winding 60 of transformer 38, voltage-sensitive capacitor 61, and capacitor 62, this circuit being tunable between 140 and 170 megacycles in response to the voltage at point 63, the junction between the elements 61 and 62. This voltage is provided by the output of the automatic gain control amplifier transistor 20, the junction of its collector load resistances 22 and 23 being connected via conductor 25 and resistor 64 to point 63.

The function of the series-tunable circuit comprising the elements 60, 61, and 62 is to respond to changes in the voltage at point 63 to vary the load impedance of the radio frequency amplifier collector circuit, as by variation of the impedance reflected into the circuit of primary 37. This provides gain control of the radio frequency amplifier stage. It has been observed that output line 17 is connected to the input of a crystal filter 18, which in turn is coupled to automatic gain control amplifying transistor 20 by a cascaded series of intermediate frequency stages and an automatic gain control detector. An increase in the amplitude of the output signal on line 17 accordingly causes a change of voltage at point 63, which affects the tuning of the series circuit 60, 61, 62 in such a manner as to reduce the gain of the radio frequency stage. This accomplishes a wide magnitude of gain control with no major change in the linearity of the associated active amplifier elements.

The voltage-sensitive capacitor 61 effectively presents a dissipative resistance load to winding 60, this winding being tightly coupled to primary 37. The resistance of element 61 depends on the D.C. drive from the automatic gain control amplifier 20, such resistance varying inversely with the magnitude of the input signal. That is, a strong input signal produces a low resistance across the tertiary winding 60. The tertiary loading of the primary drops the Q and broadens the pass band of the tuned primary. It also decreases the effective coupling and the resultant signal transfer between primary 37 and secondary 44. The stronger the input signal becomes, the more this coupling is reduced. This is accomplished without substantial detuning of the tuned primary circuit. The result is an extremely stiff gain control or flat automatic gain control characteristic after a delayed start.

The oscillator 16 and associated circuits comprise a crystal-controlled Hartley oscillator.

Referring now to the unit 19 of FIG. 1, comprising the four intermediate frequency stages and the automatic gain control detector, it is illustrated in detail in FIG. 2.

It comprises first intermediate frequency transistor 84, second intermediate frequency transistor 85, input transformer 86, interstage transformers 87 and 88, back-biased silicon diode pairs 89—90 and 91—92, the latter being employed as variable capacitors in attenuator bridge circuits, and transformers 93 and 94.

Diode 89 is returned through a decoupling choke 96 to the automatic gain control line 70 for the first intermediate frequency stage. Similarly, diode 91 is returned through decoupling choke 97 to the automatic gain control line 71. Diode 90 is back-biased to a voltage equal to the greatest automatic gain control voltage anticipated from line 70. Diode 92 is back-biased to a voltage equal to the greatest automatic gain control voltage anticipated on line 71. The secondary of transformer 93 is center-tapped and returned to a D.C. voltage equal to the minimum automatic gain control voltage on line 70. The center tap of transformer 94 is similarly returned to a D.C. voltage equal to the minimum automatic gain control voltage on line 71. The bridge attenuator comprising diodes 89 and 90 is so arranged that when the impedances of those two diodes are equal, input signal to the second intermediate frequency stage is cut off, but if the diode impedances are greatly different from each other, then input power is transferred to the following stage. Likewise, if the impedances of diodes 91 and 92 are equal, input signal to the third intermediate frequency stage is cut off, but if the diode impedances are substantially different, power is transferred.

The capacitors 98, 99, 100, 101, 102, and 103 are radio frequency by-pass capacitors. Because of the fact that the impedance of silicon junction diodes is a function of the back-bias control, the power transfer through these stages is exercised by varying the automatic gain control voltages on lines 70 and 71, and this variation is produced in the manner described in the above-mentioned copending Bastian patent application. The bridge attenuators and intermediate frequency amplifier system disclosed in FIG. 2 are per se conventional. The use of AGC to control a bridge attenuator using back-biased diodes is shown and described in a paper entitled "A New Method of Automatic Gain Control for HF and VHF Transistor Amplifiers" by Chow and Lazar, at pages 40 and 41 of the Digest of Technical Papers of the 1959 Transistor and Solid State Circuits Conference, published at Philadelphia, Pennsylvania, in 1959 by H. G. Sparks of the Moore School of Electrical Engineering of the University of Pennsylvania. Such paper is referred to and herein incorporated by reference. The use of bridge-type attenuators greatly increases the signal-handling capabilities of an intermediate frequency amplifying stage.

The construction and operation of the intermediate frequency amplifying circuitry illustrated in FIG. 2, so far as the function of intermediate frequency amplification per se is concerned, will be well understood by those skilled in the art.

The following circuit parameters have been found satisfactory in one successfully operated and tested embodiment of the invention.

| Resistors: | Value |
|---|---|
| **106, 107** | Each 5600 ohms. |
| **57** | 220 ohms. |
| **48** | 2200 ohms. |
| **45** | 27,000 ohms. |
| **46** | 8200 ohms. |
| **64** | 100,000 ohms. |
| **34** | 750 ohms. |
| **30** | 8200 ohms. |
| **29** | 33,000 ohms. |
| **21** | 820 ohms. |
| **22** | 3900 ohms. |
| **23** | 219,000 ohms. |
| **112** | 27,000 ohms. |
| **113** | 5600 ohms. |
| **114** | 330 ohms. |
| **116** | 390 ohms. |
| **124** | 330 ohms. |
| **125, 126** | Each 68,000 ohms. |
| **127, 128** | Each 18,000 ohms. |
| **129** | 27,000 ohms. |
| **130** | 5600 ohms. |
| **131** | 390 ohms. |
| **136** | 1000 ohms. |
| **137** | 1000 ohms. |

| Capacitors: | |
|---|---|
| **77** | .001 microfarad. |
| **76** | .001 microfarad. |
| **117** | 15 micromicrofarads. |
| **108** | 22 micromicrofarads. |
| **74** | .01 microfarad. |
| **73** | .01 microfarad. |

| Capacitors: | Value |
|---|---|
| 50 | 39 micromicrofarads. |
| 72 | .01 microfarad. |
| 62 | 83 micromicrofarads. |
| 39 | 12 micromicrofarads. |
| 35 | .001 microfarad. |
| 27 | .001 microfarad. |
| 32 | .001 microfarad. |
| 26 | 2 micromicrofarads. |
| 82, 80 | Each .68 micromicrofarad. |
| 78, 79, 81 | Each 12 micromicrofarads. |
| 83 | 5.1 micromicrofarads. |
| 111 | 27 micromicrofarads. |
| 115 | .01 microfarad. |
| 117 | .01 microfarad. |
| 118 | .01 microfarad. |
| 119, 120 | Each 15 micromicrofarads. |
| 98, 99, 101, 102 | Each .001 microfarad. |
| 132 | .01 microfarad. |
| 134 | 240 micromicrofarads. |

| Voltage-sensitive capacitor: | Type |
|---|---|
| 61 | PC–116–22 |

| Crystal: | |
|---|---|
| 75 | Y1 |

| Chokes: | | Value |
|---|---|---|
| 33 | microhenries | .22 |
| 54 | do | 2.7 |
| 58 | do | 2.7 |
| 97 | do | 100 |
| 96 | do | 100 |
| 138 | do | 100 |
| 139 | do | 100 |

| Diodes and Transistors: | Type |
|---|---|
| 16 | N104B |
| 15 | N104B |
| 14 | N104B |

| Diodes and Transistors: | Type |
|---|---|
| 20 | 2N1613 |
| 89, 90, 91, 92 | V27B |
| 84 | N104B |

While there has been shown and described what is at present believed to be the preferred embodiment of the invention, it will be understood by those skilled in the art that various changes and modifications may be made therein without departing from the scope of the invention as defined in the appended claim.

I claim:

In a radio frequency receiver of the type including a radio frequency stage having an output circuit, a mixer stage having an input, a local oscillator stage, and a source of automatic gain control potential, the combination of:

a transformer having a tuned primary included in the output of the radio frequency stage, a secondary winding coupled to the input of said mixer, and a tertiary winding tunable to control the transfer of power from said primary to said secondary;

a voltage-sensitive capacitor included in a series tunable circuit with said tertiary winding;

a coupling between said source of automatic gain control potential and said capacitor to control the frequency of said tunable circuit and the loading of said primary, thereby effectively to control the gain of said radio frequency stage;

and a resonant circuit tuned to the undesired image frequency connected between a tap on said primary and a point of reference potential.

References Cited in the file of this patent

UNITED STATES PATENTS

| | | |
|---|---|---|
| 1,866,456 | Fichandler | July 5, 1932 |
| 1,909,954 | Hentschel | May 23, 1933 |
| 2,137,435 | Yolles | Nov. 22, 1938 |
| 2,947,859 | MacDonald | Aug. 2, 1960 |